United States Patent
Bae et al.

(10) Patent No.: US 8,994,966 B2
(45) Date of Patent: Mar. 31, 2015

(54) METHOD OF CHANGING POSITION OF MENU IN IMAGE FORMING APPARATUS AND IMAGE FORMING APPARATUS CONFIGURED TO CHANGE POSITION OF MENU

(75) Inventors: Jung-nam Bae, Suwon-si (KR); Tae-gyun Cho, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 340 days.

(21) Appl. No.: 13/362,412

(22) Filed: Jan. 31, 2012

(65) Prior Publication Data

US 2012/0194843 A1   Aug. 2, 2012

(30) Foreign Application Priority Data

Feb. 1, 2011   (KR) .......................... 10-2011-0010301

(51) Int. Cl.
*G06F 3/12*   (2006.01)
*H04N 1/00*   (2006.01)

(52) U.S. Cl.
CPC ....... *H04N 1/00416* (2013.01); *H04N 1/00474* (2013.01); *H04N 1/00482* (2013.01)

USPC .......................................... 358/1.13; 358/1.1

(58) Field of Classification Search
USPC .................................................. 358/1.13, 1.1
See application file for complete search history.

(56) References Cited

U.S. PATENT DOCUMENTS

2010/0064256 A1*   3/2010   Esaki ............................ 715/825

FOREIGN PATENT DOCUMENTS

JP        2010-61583        3/2010

* cited by examiner

*Primary Examiner* — Martin Mushambo
(74) *Attorney, Agent, or Firm* — Staas & Halsey LLP

(57) ABSTRACT

A method of changing a position of a menu in an image forming apparatus includes displaying a screen of a first mode user interface having menus for a use of a function of the apparatus, selecting any one menu of the first mode user interface, shifting the selected menu to a second mode user interface, and deleting the selected menu from the screen of the first mode user interface, adding and displaying the selected menu to a screen of the second mode user interface When the first mode is a user mode, the second mode is a manger mode, and when the first mode is the administrator mode, the second mode is a user mode.

21 Claims, 10 Drawing Sheets

METHOD OF CHANGING POSITION OF MENU IN IMAGE FORMING APPARATUS AND IMAGE FORMING APPARATUS CONFIGURED TO CHANGE POSITION OF MENU

CROSS-REFERENCE TO RELATED PATENT APPLICATION

This application claims the benefit of priority under 35 U.S.C. §119 from Korean Patent Application No. 10-2011-0010301, filed on Feb. 1, 2011, in the Korean Intellectual Property Office, the disclosure of which is incorporated herein in its entirety by reference.

BACKGROUND OF THE INVENTION

1. Field of the Invention

The present general inventive concept relates to a method of changing a position of a menu in an image forming apparatus and an image forming apparatus configured to change the position of the menu.

2. Description of the Related Art

An image forming apparatus may include various menus to set functions of the image forming apparatus. The menus may include a menu for a user of the image forming apparatus or a menu exclusively for a manager of the image apparatus. The menu for the user may be provided to a user interface having a user mode, while the menu exclusively for the manager may be provided to a user interface having an administrator mode. However, since positions of the menus are determined by a manufacturer during development of the image forming apparatus, it is difficult to change the positions of the menus due to subsequent changes in circumstances. However, since firmware should be modified to change the positions of the menus, it may inconvenience the user (or the manager) in terms of cost and time. Accordingly, a method of allowing the user to conveniently change the position of the menu is required.

SUMMARY OF THE INVENTION

The present general inventive concept provides a method of changing a position of a menu in an image forming apparatus and an image forming apparatus configured to change the position of the menu, which may conveniently change the position of the menu regarding a setting of a function of the image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of changing a position of a menu in an image forming apparatus having an administrator mode and a user mode. The method may include displaying a screen of a user interface having a first mode including one or more menus regarding the use of the function of the image forming apparatus, selecting any one menu regarding the shifting of the screen of the user interface having the first mode to a user interface having a second mode, shifting the selected menu to the user interface having the second mode, and deleting the selected menu from the screen of the user interface having the first mode, adding the selected menu to a screen of the user interface having the second mode, and displaying the selected menu on the screen of the user interface having the selected mode when the selected menu is shifted to the user interface having the second mode. When the first mode is a user mode, the second mode is a manger mode, and when the first mode is the administrator mode, the second mode is a user mode.

The foregoing and/or other features and utilities of the present general inventive concept may also be achieved by providing an image forming apparatus configured to change a position of a menu. The apparatus may have an administrator mode and a user mode. The apparatus may include a storage unit, a display unit, and a control unit. The storage unit stores one or more menus regarding the use of one or more functions of the image forming apparatus. The menus correspond to a first mode and a second mode. The display unit may display a user interface having the first mode and a user interface having the second mode. The control unit may manage positions of the menus and shifts a selected menu from the first mode to the second mode when any one menu to be shifted to the second mode is selected from a screen of the user interface having the first mode displayed by the display unit. When the first mode is the user mode, the second mode is the administrator mode, and when the first mode is the administrator mode, the second mode is the user mode. When the selected menu is shifted to a user interface having the second mode by the control unit, the selected menu may be deleted from the screen of the user interface having the first mode, and the shifted menu may be added to and displayed on a screen of the user interface having the second mode.

The foregoing and/or other features and utilities of the present general inventive concept may also be achieved by providing a method of changing a position of a menu in an image forming apparatus having an administrator mode and a user mode, the method including generating a user interface displayed on a display unit, the user interface including one or more menus each having one or more values to be set to correspond to a use of a function of an image forming unit of the image forming apparatus, selecting one of the menus and designating a position of the menu, and shifting the selected menu including the one or more values to the designated position.

The generating the interface may include generating a first user interface without the shifted menu; and generating a second user interface with the shifted menu.

The second user interface may control the function of the image forming unit according to the one or more values of the menu shifted to the designated position.

The first user interface may be used by a first user and the second user interface may be used by a second user.

The generating the interface may include generating the user interface with a menu shifting option such that a user shifts the menu of a first mode to the designated position of a second mode according to selection of the menu shifting option.

The generating the interface may include generating the user interface in a first mode to show one or more menu positions of a second mode such that a user selects one of the one or more menu positions as the position of the menu in the second mode.

The generating the interface may include generating a first user interface of a first mode to include the one or more menus, and generating a second user interface of a second mode to include one or more superordinate menus such that the shifted menus is a new superordinate menu or is included in one of the one or more superordinate menus as a subordinate menu of the one menu superordinate menu.

The generating the interface may include generating a first user interface for a first user and a second user interface for a second user such that the menu selected from a first position of the first user interface is shifted to the designated position of the second user interface and such that the first user interface is prevented from using the selected menu.

The generating the interface may include generating a first user interface including a plurality of first positions to correspond to the one or more menus and a second user interface including a plurality of second positions and the designated position to correspond to the one or more menus and the shifted menu.

The foregoing and/or other features and utilities of the present general inventive concept may also be achieved by providing a non-transitory computer-readable medium containing computer-readable codes as a program to execute a method of changing a position of a menu in an image forming apparatus having an administrator mode and a user mode, the method including generating a user interface displayed on a first position of a display unit, the user interface including one or more menus each having one or more values to be set to correspond to a use of a function of an image forming unit of the image forming apparatus, selecting one of the menus and designating a position, and shifting the selected menu including the one or more values to the designated position of the display unit.

The foregoing and/or other features and utilities of the present general inventive concept may also be achieved by providing an image forming apparatus including an image forming unit to perform a function of an image forming unit of the image forming apparatus, a display unit, and a control unit configured to generate a user interface to be displayed on the display unit, the user interface including one or more menus each having one or more values to be set to correspond to a use of a function of the image forming unit of the image forming apparatus, configured to select one of the menus and designating a position, and configured to shift the selected menu to the designated position.

BRIEF DESCRIPTION OF THE DRAWINGS

The above and/or other features and utilities of the present general inventive concept will become more readily appreciated from the following description of the embodiments, taken in conjunction with the accompanying drawings of which.

DETAILED DESCRIPTION OF THE PREFERRED EMBODIMENTS

Figure 1:
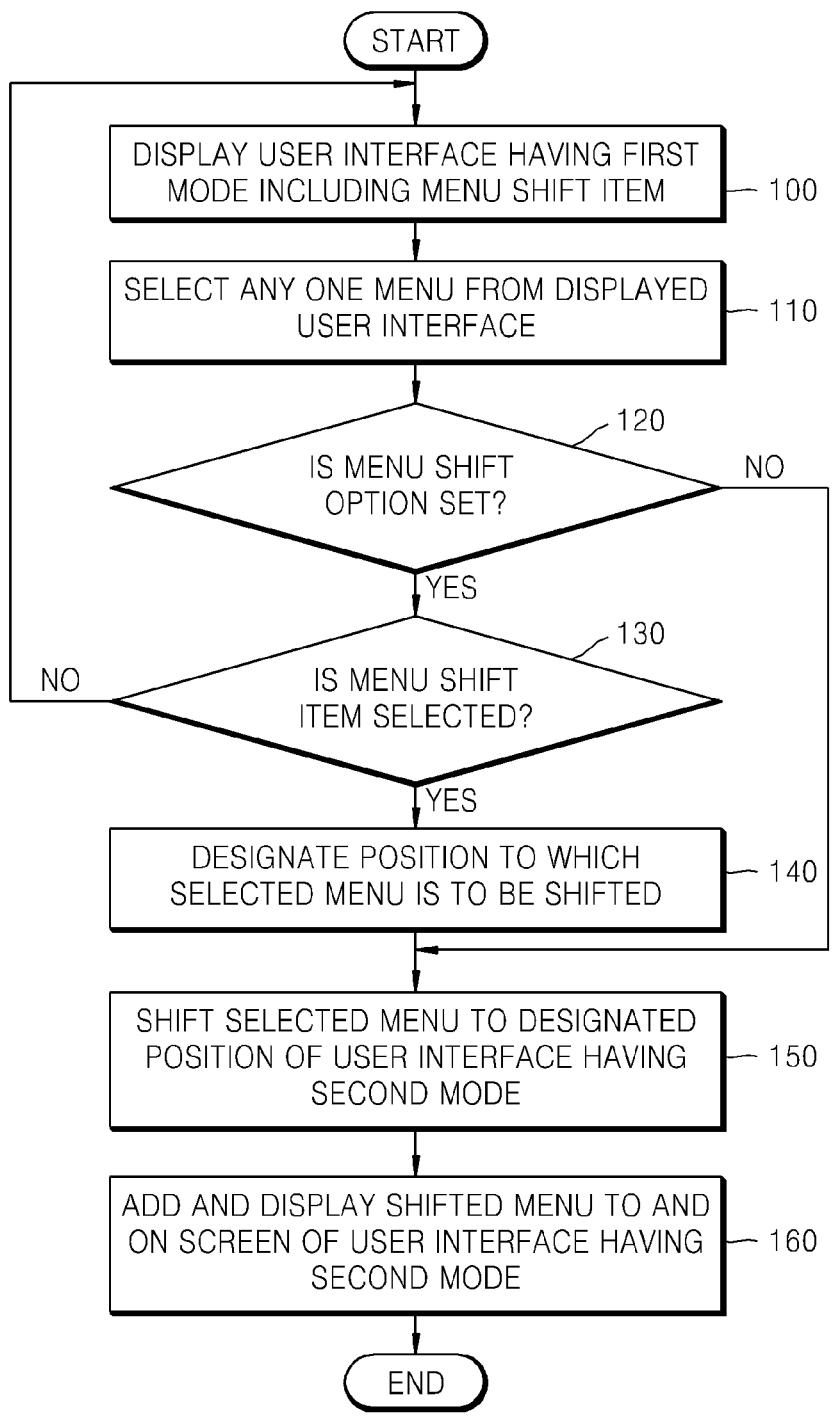
FIG. 1 is a flowchart illustrating a method of changing a position of a menu in an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
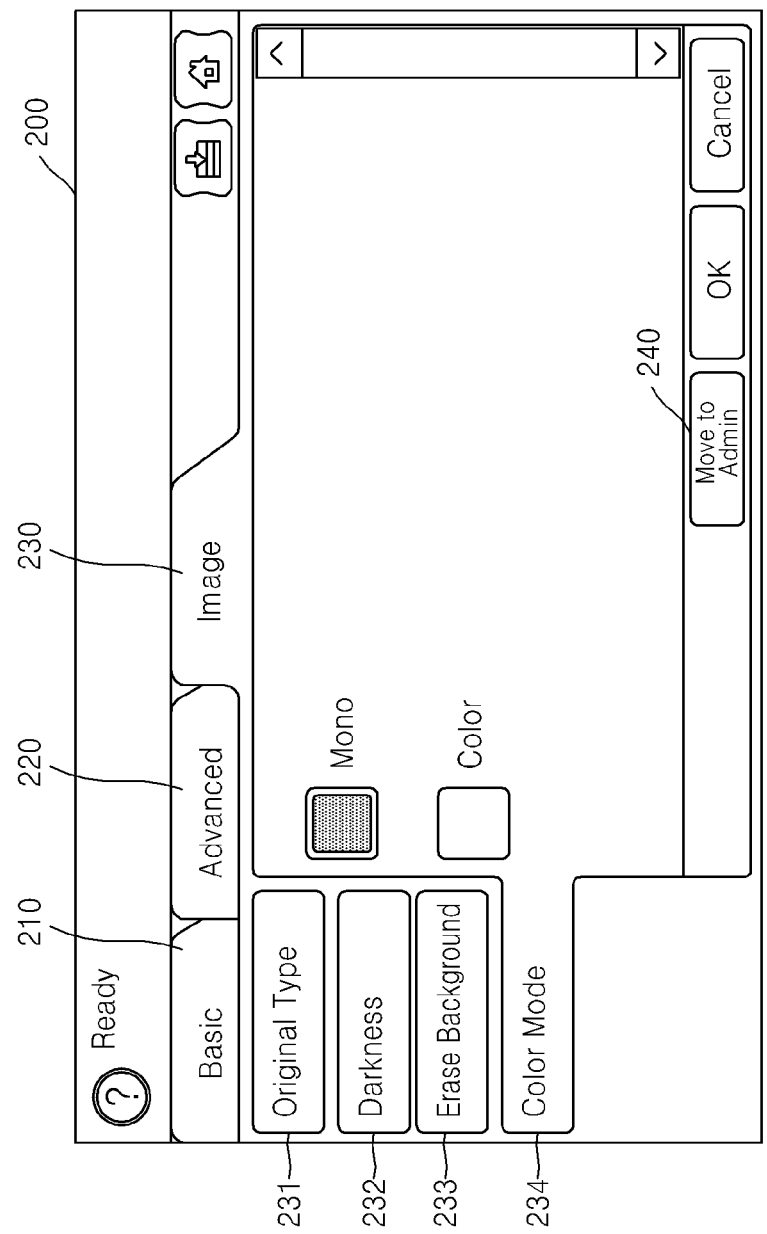
FIG. 2 is a diagram illustrating a user interface having a first mode including a menu shift item according to an embodiment of the present general inventive concept.

FIG. 1 is a flowchart illustrating a method of changing a position of a menu in an image forming apparatus according to an embodiment of the present general inventive concept. In operation 100, a screen of a user interface having a first mode including a menu shift item may be displayed. FIG. 2 is a diagram illustrating a screen 200 of a user interface having a first mode including a menu shift item according to an embodiment of the present general inventive concept. Here, the first mode may be an administrator mode. However, it is also possible that the first mode is a user mode in which a user can use one or more functions or components of the image forming apparatus and/or can set the function thereof. The administrator mode enables an administrator (a manager or another user) to also manage or use one or more functions and components of the image forming apparatus and/or can set the function thereof. It is possible that the administrator mode enables the administrator can also manage and use the user usable one or more functions. The administrator may have a priority or authority to manage the image forming apparatus. The user may not have the same priority or authority as the administrator. The user mode may be used by a plurality of users, and the administrator mode may be used by authorized managers. The authorized managers may include the user. Accordingly, the image forming apparatus may generate two interfaces of two different modes to be displayed to communicate with the user and the manager in the user mode and the administrator mode, respectively. The two interfaces may be simultaneously generated (displayed) or exclusively generated (displayed) according to selection of the modes by the user or the administrator in the image forming apparatus. The screen 200 of the user interface having the first mode including the menu shift item according to the embodiment of the present general inventive concept may include menus 210, 220, and 230, by which the user of the image forming apparatus may set a function of the image forming apparatus, and a menu shift item 240.

In operation 110, any one menu may be selected by the user from the displayed screen 200 of the user interface. The screen 200 of the user interface illustrated in FIG. 2 may include the menus 210, 220, and 230 as super ordinate menus and sub-menus 231, 232, 233, and 234 as subordinate menus corresponding to the superordinate menu 230. Accordingly, any one of the superordinate menus 210, 220, and 230 may be selected, and a subordinate menu of the selected superordinate menu may be selected so that any one menu can be selected to shift the position of the menu from a first mode to a second mode. Here, the second mode may be a user mode usable by a user. However, the second mode may be an administrator mode usable by a manager of the image forming apparatus.

Figure 3:
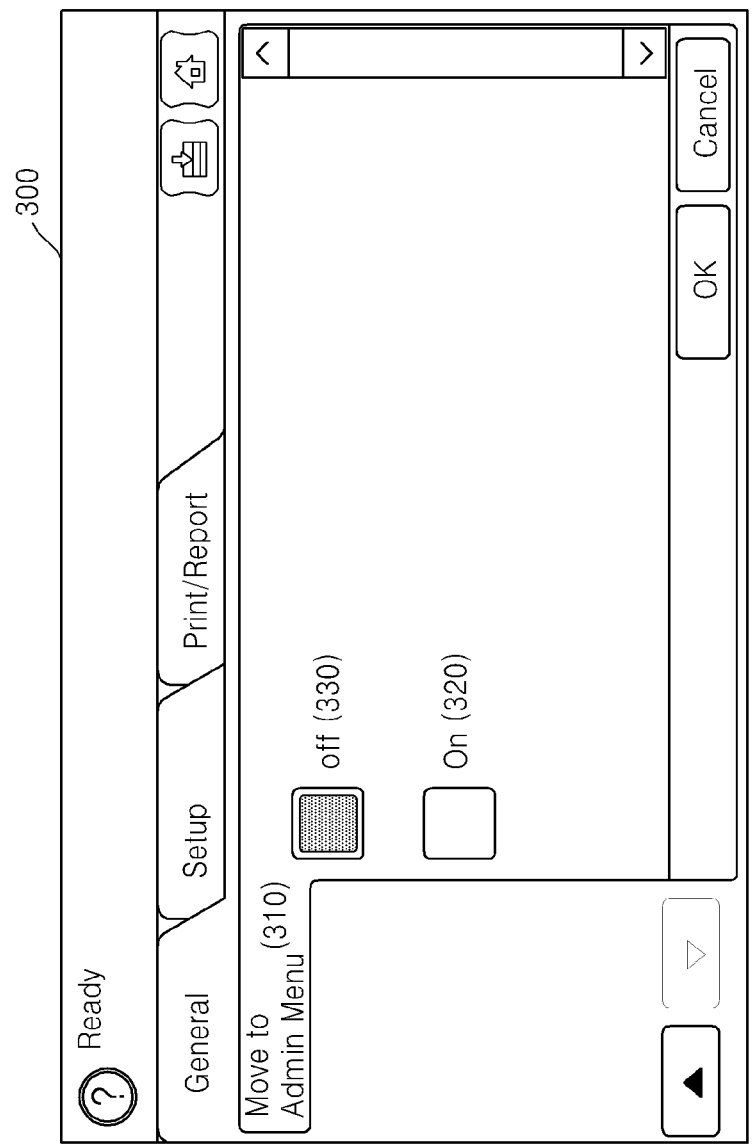
FIG. 3 is a diagram illustrating a user interface including a menu shift option of performing a method of changing a position of a menu according to an embodiment of the present general inventive concept.

In operation 120, it may be confirmed whether a menu shift option is set. FIG. 3 is a diagram illustrating a screen 300 of a user interface including a menu shift option 310 to perform a method of changing a position of a menu according to an embodiment of the present general inventive concept.

The screen 300 of the user interface illustrated in FIG. 3 may include the menu shift option 310, and a user may set the menu shift option 310 to an on state 320 or an off state 330. When the menu shift option 310 is set to the on state 320 on the screen 300 of the user interface illustrated in FIG. 3, a method of changing the position of a menu according to an embodiment of the present general inventive concept may be applied to the image forming apparatus. When the menu shift option 310 is set to the on state 320, a set value may be stored in the image forming apparatus.

Referring to FIGS. 1 and 3, in operation 120, it may be checked whether the menu shift option 310 is set to the on state on the screen 300 of the user interface of FIG. 3. Accordingly, since the menu shift option 310 set to the on state on the screen 300 of the user interface of FIG. 3 is stored in the image forming apparatus, by extracting a set value stored in the image forming apparatus, it may be checked whether the menu shift option 310 is set to the on state. As a result, when it is checked that the menu shift option 310 is set to the on state, a process may be performed in operation 130.

When the menu shift option 310 is set to the off state, the process may be ended. However, when the menu shift option 310 is set to the off state, a screen of a user interface including one or more menus regarding the setting of the function of the image forming apparatus may be displayed, the menus of the displayed screen of the user interface may be selected to change the setting of the function of the image forming apparatus.

Figure 4:
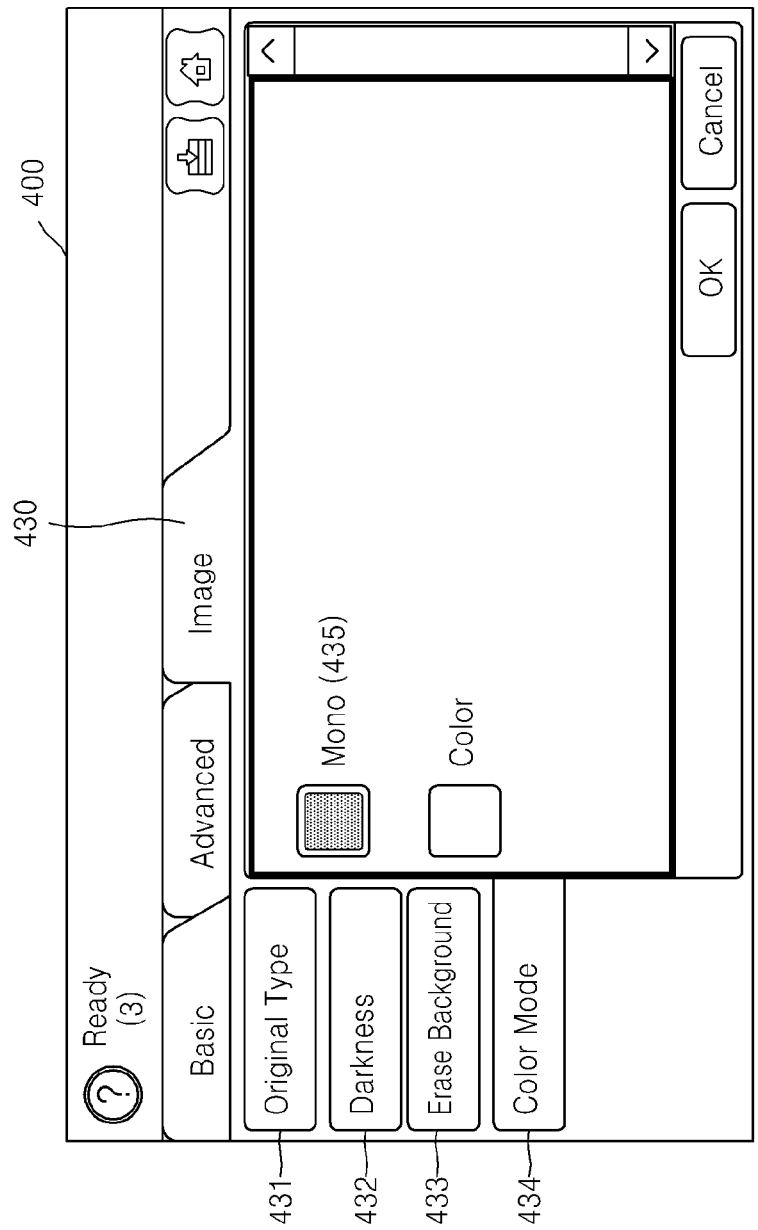
FIG. 4 is a diagram illustrating a user interface including menus regarding the setting of the function of an image forming apparatus.

FIG. 4 is a diagram illustrating a user interface including menus regarding the setting of the function of an image forming apparatus. In a screen 400 of the user interface illustrated in FIG. 4, "Image" 430 may be selected as a superordinate menu, "Color mode" 434 may be selected as a subordinate menu, and "Mono" 435 may be set as a value for the selected subordinate menu.

In operation 130, it may be checked whether a menu shift item is selected. It may be checked whether the menu shift item 240 is selected on the screen 200 of the user interface of FIG. 2. When the menu shift option 310 is set to the on state in operation 120, the menu shift item 240 may be selected from the screen 200 of the user interface of FIG. 2. In the screen 200 of the user interface of FIG. 2, the menu shift item 240 may be enabled when the menu shift option 310 is set to the on state, or may be enabled irrespective of whether the menu shift option 310 is set to the on or off state. When the menu shift item 240 is selected, a selected value may be stored in the image forming apparatus. Accordingly, it may be confirmed whether the menu shift item 240 is selected by extracting the value stored in the image forming apparatus. As a result, when it is confirmed that the menu shift item 240 is selected, the process may be performed in operation 140.

When the menu shift item 240 is not selected, the process may return to operation 100 so that operations 100 through 120 can be repeated.

Figure 5:
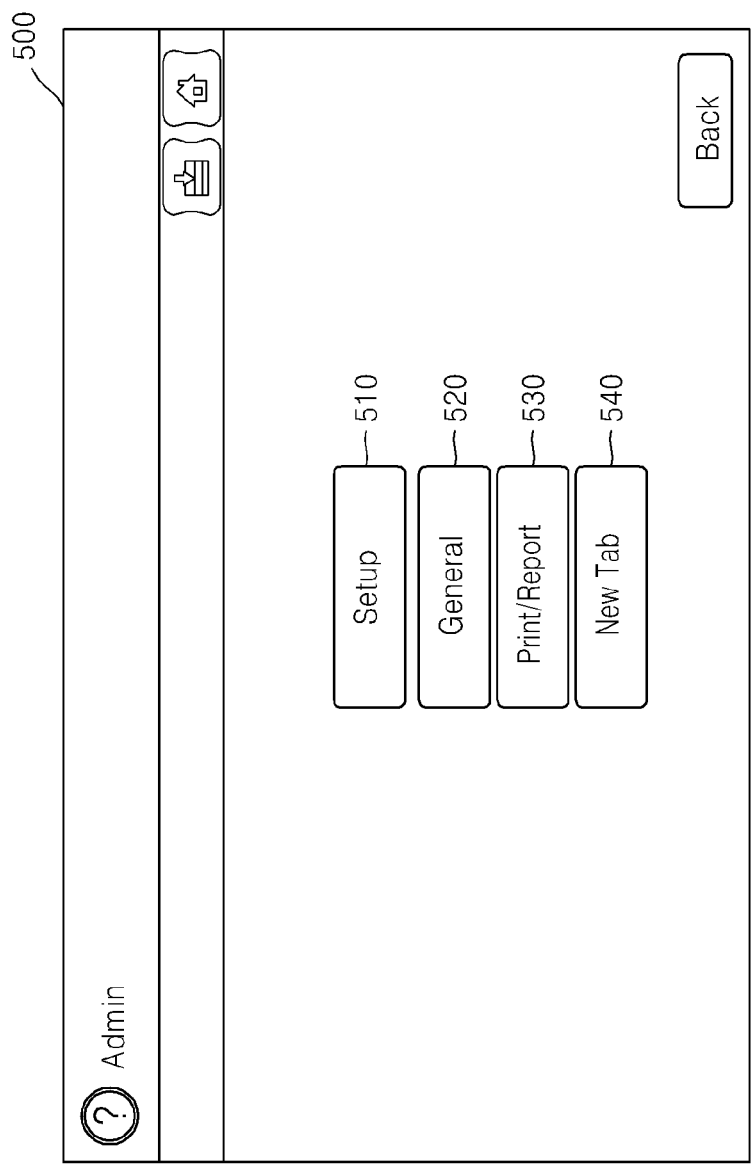
FIG. 5 is a diagram illustrating a user interface configured to designate a position to which a selected menu is shifted, according to an embodiment of the present general inventive concept.

In operation 140, a position to which the selected menu is shifted may be designated. FIG. 5 is a diagram illustrating a user interface configured to designate the position to which the selected menu is shifted, according to an embodiment of the general present inventive concept. As illustrated in FIG. 5, superordinate menus 510, 520, 530, and 540 indicating a position to which a menu selected from a user interface having a second mode is shifted may be displayed, and one menu capable of shifting the selected menu may be designated among the displayed menus.

In operation 150, the selected menu may be shifted to a designated position of the screen 200 of the user interface having the second mode. According to an embodiment of the general present inventive concept, menus may be allowed to correspond to the first and second modes and stored as a table in the image forming apparatus. In this case, the table may also indicate positions of the first and second modes including menus. Accordingly, the selected menu may be shifted from the first mode to the second mode and stored so that the selected menu can be shifted to the designated position of the screen 200 of the user interface having the second mode.

Figure 9:
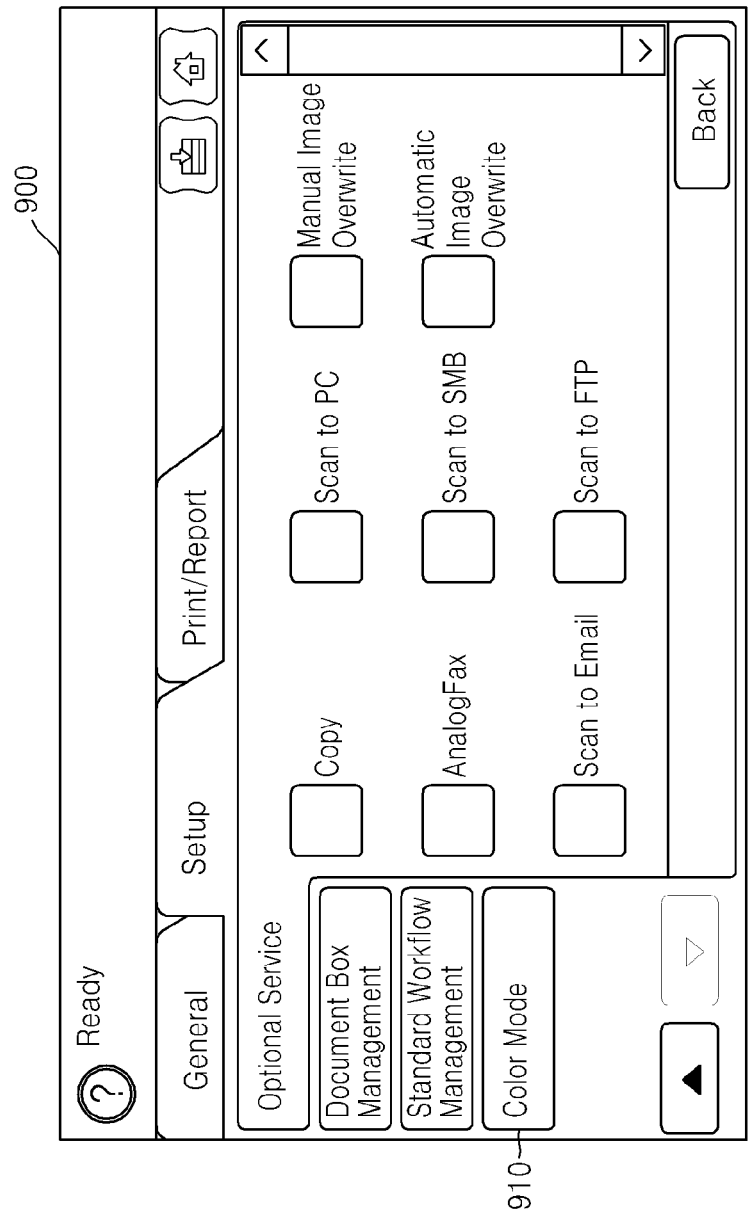
FIG. 9 is a diagram illustrating a user interface having a second mode in which a menu is changed, according to an embodiment of the present general inventive concept.

In operation 160, when the selected menu is shifted to the screen 200 of the user interface having the second mode, the shifted menu may be deleted from the screen of the user interface having the first mode and may not be displayed. As illustrated in FIG. 9, the shifted menu may be added to and displayed on the screen of the user interface having the second mode.

Figure 6:
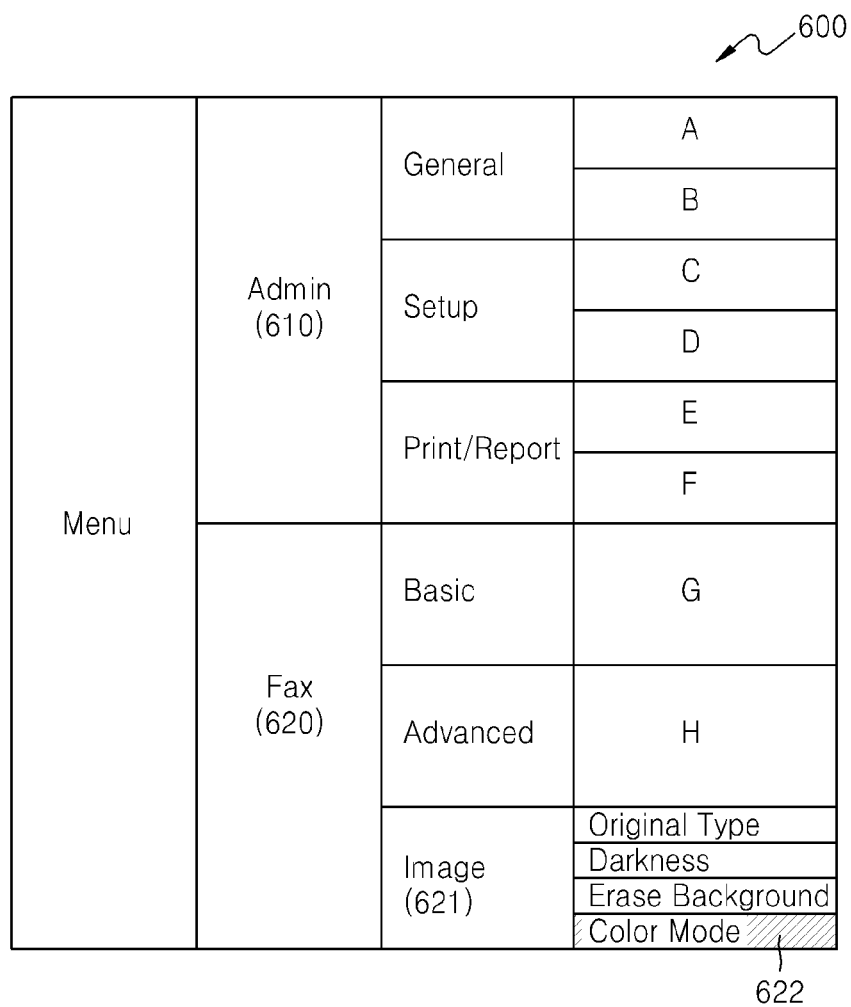
FIG. 6 is a diagram illustrating a table in which menus are stored, according to an embodiment of the present general inventive concept.

FIG. 6 is a diagram illustrating a table 600 in which menus are stored, according to an embodiment of the general present inventive concept. As illustrated in FIG. 6, the table 600 may contain superordinate items Admin 610 and Fax 620 and subordinate items included in each of the superordinate items. A menu "Color Mode" 622 may be located as a subordinate menu of "Image" 621 of the superordinate item "Fax" 620.

Figure 7:
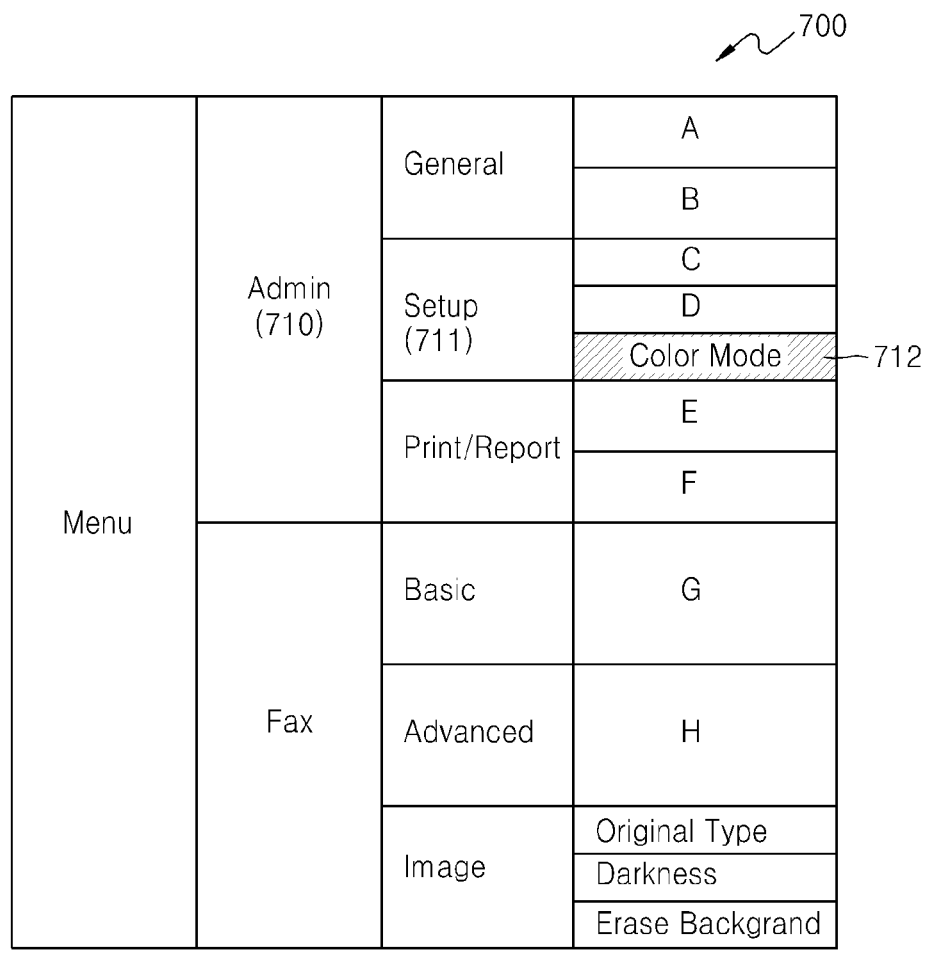
FIG. 7 is a diagram illustrating a table in which menus whose positions are changed are stored, according to an embodiment of the present general inventive concept.

FIG. 7 is a diagram illustrating a table in which menus whose positions are changed are stored according to an embodiment of the general present inventive concept. As illustrated in FIG. 7, in a table 700, a menu "Color Mode" 712 may be shifted to a position corresponding to a subordinate menu of a menu "Setup" of a superordinate menu "Admin" 710.

Figure 8:
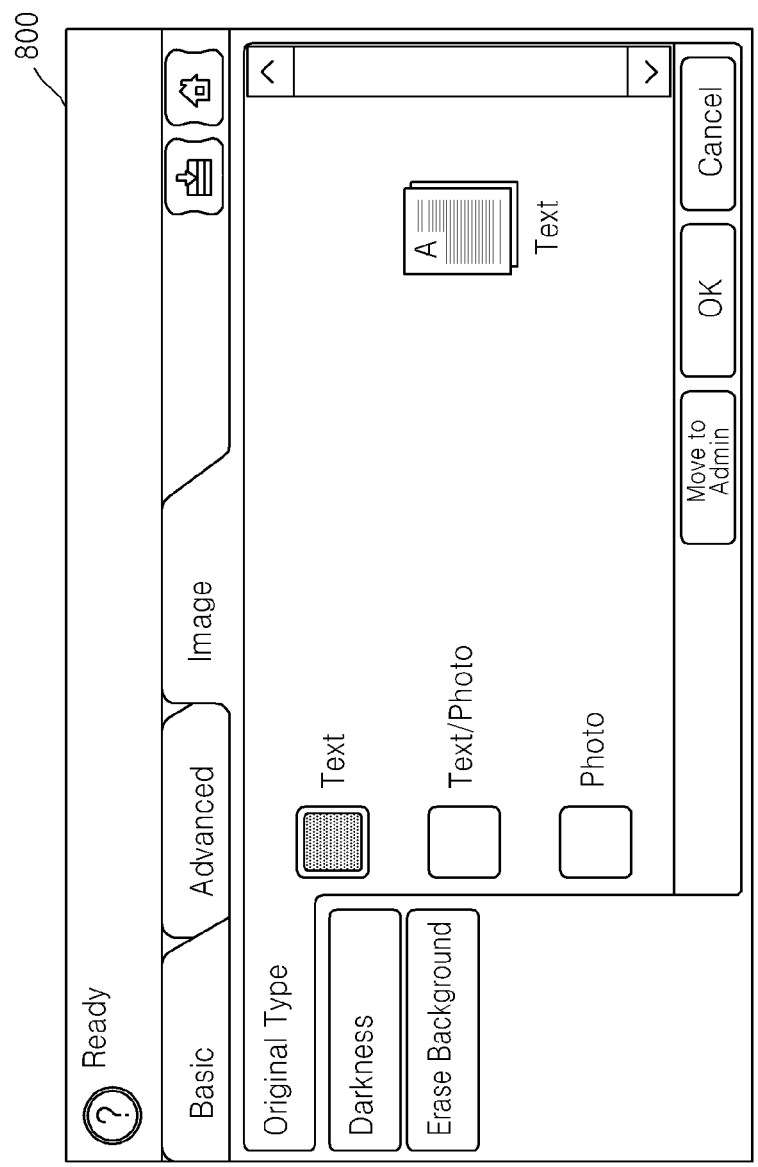
FIG. 8 is a diagram illustrating a user interface having a first mode in which a menu is changed, according to an embodiment of the present general inventive concept.

FIG. 8 is a diagram illustrating a user interface 800 having a first mode in which a menu is changed according to an embodiment of the general present inventive concept. As compared with the user interface of FIG. 2 prior to the change of the menu, it can be seen that a subordinate menu "Color Mode" 234 of a superordinate menu "Image" 230 is deleted from the user interface 800 having the first mode in which the menu is changed.

FIG. 9 is a diagram illustrating a screen of a user interface 900 having a second mode in which a menu is changed according to an embodiment of the general present inventive concept. In the screen of the user interface 900 illustrated in FIG. 9, a menu "Color Node" 910 disposed on a screen of a user interface having a first mode may be newly added. Thus, according to a method of changing the position of a menu in an image forming apparatus according to an embodiment of the general present inventive concept, a menu to be changed may be selected from the screen of the user interface having the first mode, and a position may be designated on the screen of the user interface having the second mode, so that the menu located on the screen of the user interface having the first mode can be freely shifted to a desired position of the screen of the user interface having the second mode.

Figure 10:
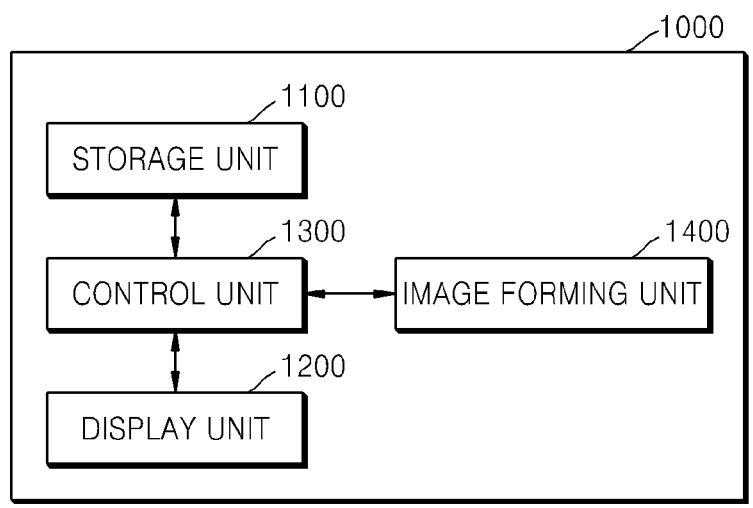
FIG. 10 is a block diagram illustrating an image forming apparatus configured to change a position of a menu, according to an embodiment of the present general inventive concept.

FIG. 10 is a block diagram illustrating an image forming apparatus 1000 configured to change a position of a menu according to an embodiment of the general present inventive concept. According to an embodiment, the image forming apparatus 1000 configured to change the position of the menu may include a storage unit 1100, a display unit 1200, a control unit 1300, and an image forming unit 1400.

The storage unit 1100 may allow one or more menus regarding the setting of the function of the image forming apparatus 1000 to correspond to first and second modes and store the menus. Here, the first mode may be a user mode and the second mode may be an administrator mode. Also, as illustrated in FIG. 6, the menus may be stored as a type of a table indicating positions in which the menus will be stored. Furthermore, the storage unit 1110 may store a control program to drive or operate the image forming apparatus, various applied programs, data received from an external system, and various data generated during execution of programs.

The display unit 1200 may display a screen of a user interface having a first mode including a menu shift item. An example of the screen of the user interface having the first mode including the menu shift item, which may be displayed by the display unit 1200, is illustrated in FIG. 2. After any one menu is selected by a user from the screen of the user interface of FIG. 2, which may be displayed by the display unit 1200, when the menu shift item 240 is selected, the control unit 1300 may shift the selected menu to a specific position of the screen of the user interface having the second mode. In this case, the display unit 1200 may display a screen of a user interface illustrated in FIG. 5 so that the user can designate the specific position to which the selected menu is to be shifted. When the screen of the user interface is displayed as illustrated in FIG. 5, the user may designate a position, to which the selected menu is to be shifted, on the screen of the user interface of FIG. 5. When the position to which the selected menu is to be shifted is designated by the user, the control unit 1300 may change the contents of a table stored in the storage unit 1100. For example, when the user selects an item "Color Mode" from the screen of the user interface of FIG. 2 and selects an item "Setup" from the screen of the user interface of FIG. 5, the controller 1300 may shift a subordinate menu "Color Mode" 622 of a menu "Image" 621 of FIG. 6 to a subordinate menu "Color Mode" 712 of a menu "Setup" 711 as illustrated in FIG. 7. The display unit 1200 may be disposed on a housing of a main body of the image forming apparatus such that a user can control the menu through the corresponding interface generated by the control unit 1300 and displayed on a screen of the display unit 1200. The display unit 1200 may be an input/output unit, for example, a touch panel, to display an interface generated from the control unit 1300 and to receive a user input to perform the above-described operations.

As a result, the subordinate menu "Color Mode" 622 of the menu "Image" 621 illustrated in FIG. 6 may be deleted, and the subordinate menu "Color Mode" 712 of the menu "Setup" 711 illustrated in FIG. 7 may be added. The menu, for example, "Color Mode" 622 or 712, may include one or more values to be set through the interface so that the performance of the image forming apparatus can be controlled by the set values of the menu. That is, the menu may include a value of mono and a value of color, and then the image forming apparatus may be controlled to perform the function, for example, a printing function or a scanning function, according to selection or input of the value of the menu. It is possible that since the subordinate menu "Color Mode" 622 is deleted from the menu "Image" 621, the first mode user of the interface 600 may not control the subordinate menu "Color Mode" 622 and/or the values corresponding to the subordinate menu "Color Mode" 622. That is, the first mode user of the interface 600 may not control the performance of the function of the image forming apparatus according to the subordinate menu "Color Mode" 622. However, the second user of the interface 700 may control the performance of the function of the image forming apparatus according to the set value of the subordinate menu "Color Mode" 712. It is possible that the menu of a color mode may be exclusively controlled by a user of a first mode, and thus a user of a second mode is excluded to control the menu of a color mode, during the use of the image forming apparatus. According to the embodiment, the menu can be changed to a first position of a first interface for a first user to a second position of a second interface for a second user during performance of functions of the image forming apparatus.

The above-described operations may be performed when the menu shift option 310 is set to the on state 320 on the screen 300 of the user interface of FIG. 3 to perform a method of changing the position of a menu using the display unit 1200. When the menu shift option 310 is set to the on state 320, since a set value is stored in the storage unit 1100, the control unit 1300 may extract a value stored in the storage unit 1100 and confirm whether the menu shift option 310 is set to the on state.

The image forming unit 1400 may perform an image formation operation in response to instructions of the control unit 1300. More specifically, the image forming unit 1400 may perform print, fax, copy, and scan operations for the image forming apparatus.

In the above-described embodiments, the first mode may be a user mode and the second mode may be an administrator mode. However, according to an embodiment, the first mode may be the administrator mode and the second mode may be the user mode, one or more menus may be shifted between the two modes.

According to the embodiments of the general present inventive concept, a method of changing a position of a menu in an image forming apparatus according to an embodiment of the general present inventive concept and an image forming apparatus using the method may display a user interface having a first mode including one or more menus regarding the setting of the function of the image forming apparatus, select any one menu from the user interface having the first mode, and shift the selected menu to a user interface having a second mode. When the selected menu is shifted to the user interface having the second mode, the shifted menu may be added to and displayed on a screen of the user interface having the second mode. A menu of the image forming apparatus may be conveniently changed to a desired position through the above-described operations of changing the position of the menu.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of changing a position of a menu in an image forming apparatus having an administrator mode and a user mode, the method comprising:
   storing one or more menus regarding a use of a function of the image forming apparatus, each of the one or more stored menus corresponding to one of a user interface having a first mode and a user interface having a second mode;
   displaying a screen of the user interface having the first mode according to the one or more stored menus corresponding to the first mode;
   selecting any one menu regarding shifting of the screen of the user interface having the first mode to the user interface having the second mode;
   shifting the selected menu to the user interface having the second mode; and
   deleting the selected menu from the screen of the user interface having the first mode, adding the selected menu to a screen of the user interface having the second mode by adding the selected menu to the one or more stored menus corresponding to the second mode, and displaying the selected menu on the screen of the user interface having the second mode according to the one or more stored menus corresponding to the second mode when the selected menu is shifted to the user interface having the second mode,
   wherein when the first mode is the user mode, the second mode is the administrator mode, and when the first mode is the administrator mode, the second mode is the user mode.

2. The method of claim 1, further comprising designating thea position of the screen of the user interface having the second mode on which the menu to be shifted to the second mode is to be displayed,
   wherein the shifting of the selected menu to the user interface having the second mode comprises shifting the selected menu to the designated position of the user interface having the second mode.

3. The method of claim 1, which is embodied when a menu shift option is set.

4. The method of claim 1, wherein the user interface having the first mode includes a menu shift item,
   wherein the shifting of the selected menu to the user interface having the second mode comprises selecting the menu shift item.

5. The method of claim 1, wherein the shifting of the selected menu to the user interface having the second mode comprises shifting the selected menu from the first mode to the second mode in a table in which the menus corresponding to the first and second modes are stored.

6. The method of claim 1, wherein:
   each of the first and second modes comprises a superordinate menu;
   each superordinate menu includes one or more corresponding subordinate menus regarding the use of the function of the image forming apparatus; and
   shifting of the selected menu to the user interface having the second mode comprises changing a selected subordinate menu to correspond to a different superordinate menu.

7. An image forming apparatus configured to change a position of a menu, the apparatus having an administrator mode and a user mode, the apparatus comprising:
   a storage unit configured to store one or more menus regarding a use of a function of the image forming apparatus, each of the one or more menus corresponding to one of a first mode and a second mode;
   a display unit configured to display a user interface having the first mode and a user interface having the second mode according to the one or more stored menus, the user interface having the first mode being configured to receive a selection of any one menu; and
   a control unit configured to manage the positions of the menus and shift the selected menu from the first mode to the second mode when any one menu to be shifted to the second mode is selected from a screen of the user interface having the first mode displayed by the display unit,
   wherein when the first mode is the user mode, the second mode is the administrator mode, and when the first mode is the administrator mode, the second mode is the user mode,
   and wherein when the selected menu is shifted to a user interface having the second mode by the control unit, the selected menu is deleted from the screen of the user interface having the first mode, and the shifted menu is added to and displayed on a screen of the user interface having the second mode by being added to the one or more stored menus corresponding to the second mode.

8. The apparatus of claim 7, wherein the display unit displays a user interface for designating the position of a menu to be shifted on the screen of the user interface having the second mode,
   and when a specific position is designated in the displayed user interface, the control unit shifts the selected menu from the first mode to the designated specific position of the second mode.

9. The apparatus of claim 7, wherein the control unit operates when a menu shift option is set in a user interface configured to set the menu shift option.

10. The apparatus of claim 7, wherein the user interface having the first mode includes a menu shift item,
    and when the menu shift item is selected from the user interface having the first mode, the control unit shifts the selected menu to the second mode.

11. A method of changing a position of a menu in an image forming apparatus having an administrator mode and a user mode, the method comprising:
    generating a user interface displayed on a display unit, the user interface including one or more menus each having one or more values to be set to correspond to a use of a function of an image forming unit of the image forming apparatus;
    selecting one of the menus and designating a position of the selected menu on the user interface; and
    shifting the selected menu including the one or more values to the designated position on the user interface.

12. The method of claim 11, wherein the generating the interface comprises:
    generating a first user interface without the shifted menu; and
    generating a second user interface with the shifted menu.

13. The method of claim 12, wherein the second user interface controls the function of the image forming unit according to the one or more values of the menu shifted to the designated position.

14. The method of claim 12, wherein the first user interface is used by a first user and the second user interface is used by a second user.

15. The method of claim 11, wherein the generating the interface comprises:

generating the user interface with a menu shifting option such that a user shifts the menu of a first mode to a designated position of a second mode according to selection of a menu shifting option.

16. The method of claim 11, wherein the generating the interface comprises:

generating the user interface in a first mode to show one or more menu positions of a second mode such that a user selects one of the one or more menu positions of the second mode as the position of the menu in the second mode.

17. The method of claim 11, wherein the generating the interface comprises:

generating a first user interface of a first mode to include the one or more menus; and generating a second user interface of a second mode to include one or more superordinate menus such that the shifted menus is a new superordinate menu or is included in one of the one or more superordinate menus as a subordinate menu of the one menu superordinate menu.

18. The method of claim 11, wherein the generating the interface comprises:

generating a first user interface for a first user and a second user interface for a second user such that the menu selected from a first position of the first user interface is shifted to a designated position of the second user interface and such that the first user interface is prevented from using the selected menu.

19. The method of claim 11, wherein the generating the interface comprises:

generating a first user interface including a plurality of first positions to correspond to the one or more menus and a second user interface including a plurality of second positions and the designated position to correspond to the one or more menus and the shifted menu.

20. A non-transitory computer-readable medium containing computer-readable codes as a program to execute a method of changing a position of a menu in an image forming apparatus having an administrator mode and a user mode, the method comprising:

generating a user interface displayed on a first position of a display unit, the user interface including one or more menus each having one or more values to be set to correspond to a use of a function of an image forming unit of the image forming apparatus;

selecting one of the menus and designating a position of the selected menu on the user interface; and shifting the selected menu including the one or more values to the designated position on the user interface.

21. An image forming apparatus comprising:

an image forming unit to perform a function of an image forming unit of the image forming apparatus:

a display unit; and a control unit configured to generate a user interface to be displayed on the display unit, the user interface including one or more menus each having one or more values to be set to correspond to a use of a function of the image forming unit of the image forming apparatus, configured to select one of the menus and designating a position of the selected menu on the user interface, and configured to shift the selected menu to the designated position on the user interface.

* * * * *

UNITED STATES PATENT AND TRADEMARK OFFICE
CERTIFICATE OF CORRECTION

| | | |
|---|---|---|
| PATENT NO. | : 8,994,966 B2 | Page 1 of 1 |
| APPLICATION NO. | : 13/362412 | |
| DATED | : March 31, 2015 | |
| INVENTOR(S) | : Jung-nam Bae et al. | |

It is certified that error appears in the above-identified patent and that said Letters Patent is hereby corrected as shown below:

On the Title Page, Column 2, Item (57) Abstract
Line 8, delete "interface" and insert -- interface. --, therefor.

In the Claims
Column 9, Line 39, delete "thea" and insert -- a --, therefor.

Signed and Sealed this
Twentieth Day of October, 2015

Michelle K. Lee
*Director of the United States Patent and Trademark Office*